Patented Dec. 8, 1953

2,662,036

UNITED STATES PATENT OFFICE 2,662,036

METHOD OF STAINING GLASS AND GLASS STAINING COMPOSITION

Ormonde S. Levi, Toledo, Ohio, assignor to Verd-A-Ray Processing Company, Toledo, Ohio, a corporation of Ohio No Drawing. Application May 13, 1953,
Serial No. 354,895

15 Claims. (Cl. 117—65)

This invention relates to compositions and methods for staining glass and to the stained glass products thereby produced. More particularly, this invention is directed to the staining of soda-lime, borosilicate, lead glasses, and the like, and to the articles produced, such as stained flat ware, incandescent lamp bulbs stained to reduce the attraction of insects, for therapeutic or dark room uses, and the like.

This application is a continuation-in-part of my co-pending application Serial No. 153,749 entitled "Stained Glass and Method of Staining Same," filed April 3, 1950, now abandoned.

The art of staining to which the present invention is directed comprises the coloration of a glass surface, and is not to be confused with "colored glass," wherein the molten glass batch is colored by the addition of suitable ingredients. In this connection, so-called "stained glass" windows are actually windows composed of small pieces of colored glass.

The art of staining glass with copper and/or silver compounds is several hundreds years old. Usually the copper or silver salt, or both, is mixed with a suitable ochre or dispersing agent, and enough water added to provide a slurry of the desired viscosity. This slurry is then applied to the glass surface to be stained and the article is baked at a predetermined temperature to effect staining of the glass surface. The excess "mud" is then removed by washing and scrubbing. Copper salts have been used alone on borosilicate glass to provide a yellow stain and, upon reduction of the copper, a red stain. No stain is obtained by copper salt alone on soda-lime glass. Copper and silver salts have been used in combination with one another to produce amber stains on soda-lime glass, but these stains are relatively light colored, being much too light for coloring incandescent light bulbs for therapeutic use. Also, the high temperatures required for effective staining using this stain composition, may deform the thin bulb as well as metallize the staining ingredients, this latter effect greatly reducing the amount of light and heat transmitted through the bulb.

In spite of the long period in which glass stains have been known and used, and in spite of considerable research upon staining compositions, the art of staining glass has advanced so little since early times that only a very limited number of colors can be obtained by staining, and only particular glass compositions can be used. It is for this reason that the art of staining glass is seldom practiced at the present time.

There are definite advantages, however, to staining glassware rather than coloring the entire glass batch as is now the usual practice. In the first place, partially finished glassware may be colored to order. This permits those manufacturers who provide finished articles to color their glassware independently of the operation of the manufacturer who produces the glass.

Also, large colored articles, such as stained glass windows, may be produced in one sheet of glass rather than the multi-pieced leaded windows now made, and at a lower price.

Although glass enamel is the customary medium for applying labels and for decorating glassware, stains may be readily applied and are much more permanent, lasting as long as the glass to which they are applied. This is especially important due to rigid State statutes requiring the use of strong alkalis in cleaning bottles, etc., these alkali cleaning agents rapidly deteriorating the glass enamel but having little or no effect upon the stain. The use of stains in decorating glassware, however, has been restricted due to the limited number of colors obtainable and inability to control these colors.

An object of this invention, therefore, is to provide compositions and methods for staining glass in a variety of colors, and thus produce new and improved stained glass articles.

Another object of this invention is to provide compositions and methods for staining glass uniformly and for producing a stain having an accurately predetermined and reproducible color.

Still another object of this invention is to provide compositions and methods for staining several types of glass, such as soda-lime, borosilicate, lead glasses, and the like, in a variety of colors and in varying shades.

A still further object of this invention is to provide compositions and methods for staining soda-lime glass at temperatures below the softening point of the glass as well as the metallizing point of the stain composition, said stains being permanent, uniform and reproducible.

A still further object of this invention is to provide stained glass articles in a variety of colors and having accurately predetermined colors which are uniform throughout the stained area.

Still another object of this invention is to provide an amber lime glass and a method of making it that may be readily employed at a temperature low enough to avoid danger of deformation of thin glass, such as the walls of an incandescent lamp bulb, and still produce a deep amber stain satisfactory for therapeutic and dark room purposes.

An additional object of this invention is to provide a method and composition for staining a borosilicate glass yellow, for such use as in incandescent bulbs, etc.

Still another object of this invention is to provide a method for staining glass surfaces which includes the application thereto of a uniform oil dispersion which can be applied by brushing, spraying, screening or dipping, and having such viscosity and spreading characteristics that it can be applied and fired to produce glass surfaces stained in a desired pattern.

Other objects and advantages of this invention will become apparent to those skilled in the art from the following detailed description thereof.

THE INVENTION IN GENERAL

It has been discovered that the combination of copper, silver and zinc salts in the presence of inorganic chloride compounds, in uniform oil dispersion, produces an active material for staining various types of glass. Furthermore, the color of the stain may be closely controlled by correctly proportioning the staining ingredients and by careful regulation of the baking temperatures.

Staining compositions and manipulative steps illustrating the method of the present invention are set forth in the following examples:

*Example 1.*—A uniform dispersion was formed by grinding in a porcelain lined ball mill provided with porcelain balls the following composition:

| | | |
|---|---|---|
| $Cu(OH)_2$ | grams | 13 |
| $Ag_2S$ | do | 1.2 |
| $ZnS$ | do | 9.0 |
| Aluminum chloride | do | 5.8 |
| Oil | cc | 50 |
| Alcohol | cc | 20 |

The resulting oil dispersion, which was of suitable viscosity for spraying, was applied to a glass bulb, and the resulting coated bulb placed in a muffle-type furnace and fired to a temperature of about 1020° F., and allowed to cool. Residue remaining on the surface of the bulb was then washed off, and the bulb was found to have been stained to a commercially acceptable green color.

When the procedure described in the preceding paragraph was repeated except that the firing temperature was lowered to about 975° F., a commercially acceptable yellow stained bulb was produced.

*Example 2.*—Procedures identical with that described in the first paragraph of Example 1 were also carried out, but using other inorganic chloride compounds in varying amounts in place of the aluminum chloride. The chloride compounds used, the amounts, the firing temperature, and the color of the resulting stains are presented in Table I, below:

Table I

| Composition No. | Inorganic chloride compound | Grams | Firing Temperature, °F. | Stain color |
|---|---|---|---|---|
| 2 | Barium chloride | 13.7 | 1,020 | yellow. |
| 3 | Cobaltous chloride | 8.5 | 1,020 | green. |
| 4 | Potassium chloride | 9.8 | 1,020 | reddish amber. |
| 5 | Ammonium chloride | 7.0 | 1,020 | Do. |
| 6 | Calcium chloride | 7.3 | 1,020 | green. |
| 7 | Sodium chloride | 7.7 | 1,020 | reddish amber. |

*Example 3.*—A procedure identical with that described in the first paragraph of Example 1 was carried out except that the following composition was employed in forming the uniform oil dispersion:

| | | |
|---|---|---|
| Zinc chloride | grams | 14 |
| Cuprous chloride | do | 13 |
| Silver chloride | do | 1.2 |
| Ochre | do | 80 |
| Oil | cc | 50 |
| Alcohol | cc | 40 |

The finished bulb was found to have been stained to a commercially acceptable green color.

No staining is effected if, for purposes of comparison, but not in accordance with the invention, the procedure described in paragraph 1 of Example 1 is repeated using the following composition to form the uniform oil dispersion:

| | | |
|---|---|---|
| Zinc sulfide | grams | 9 |
| Copper sulfide | do | 13 |
| Silver sulfide | do | 1.2 |
| Ochre | do | 80 |
| Oil | cc | 50 |
| Alcohol | cc | 40 |

It has been found that optimum results can be achieved according to the method of the invention either when the copper, zinc, and silver salts are all chlorides, and no other inorganic chloride compound is added, as in the procedure of Example 3, above or when at least one of the salts of copper, silver and zinc is a sulfide, and the molecular ratio of sulfur to chlorine is from about 1:0.5 to about 1:25. A series of staining procedures to demonstrate the advantage of a sulfur to chlorine ratio within the indicated range was carried out, and the results are reported in Example 4, below.

*Example 4.*—In Table II, below, are presented a series of formulations demonstrating the desirability of sulfur to chlorine ratios within the range indicated above:

Table II

| Composition No. | $ZnCO_3$ | ZnS | CuCl | $Ag_2S$ | Ochre | Oil, cc. | Methanol, cc. | Firing temperature, °F. | Molecular ratio of sulphur to chlorine | Stain Color |
|---|---|---|---|---|---|---|---|---|---|---|
| 9 | 12.0 | 0.0 | 13.0 | 1.2 | 80.0 | 50.0 | 40.0 | 1,020 | 1:30.5 | yellow. |
| 10 | 11.0 | 1.0 | 13.0 | 1.2 | 80.0 | 50.0 | 40.0 | 1,020 | 1:9.73 | Do. |
| 11 | 10.0 | 2.0 | 13.0 | 1.2 | 80.0 | 50.0 | 40.0 | 1,020 | 1:5.75 | green. |
| 12 | 8.0 | 4.0 | 13.0 | 1.2 | 80.0 | 50.0 | 40.0 | 1,020 | 1:3.19 | Do. |
| 13 | 6.0 | 6.0 | 13.0 | 1.2 | 80.0 | 50.0 | 40.0 | 1,020 | 1:2.21 | Do. |
| 14 | 4.0 | 8.0 | 13.0 | 1.2 | 80.0 | 50.0 | 40.0 | 1,020 | 1:1.68 | Do. |
| 15 | 0.0 | 10.0 | 13.0 | 1.2 | 80.0 | 50.0 | 40.0 | 1,020 | 1:1.36 | Do. |
| 16 | 0.0 | 12.0 | 13.0 | 1.2 | 80.0 | 50.0 | 40.0 | 1,020 | 1:1.14 | Do. |
| 17 | 0.0 | 14.0 | 13.0 | 1.2 | 80.0 | 50.0 | 40.0 | 1,020 | 1:1 | Do. |
| 18 | 0.0 | 16.0 | 13.0 | 1.2 | 80.0 | 50.0 | 40.0 | 1,020 | 1:0.862 | Do. |
| 19 | 0.0 | 18.0 | 13.0 | 1.2 | 80.0 | 50.0 | 40.0 | 1,020 | 1:0.772 | reddish amber. |
| 20 | 0.0 | 20.0 | 13.0 | 1.2 | 80.0 | 50.0 | 40.0 | 1,020 | 1:0.695 | Do. |

Most desirably, at least two of the salts of copper, silver and zinc are sulfides, and the molecular ratio of sulfur to chlorine is from about 1:1 to about 15:1.

*Example 5.*—A procedure identical with that described in the first paragraph of Example 1 was carried out except that the copper salt constituted also the inorganic chloride compound. The formulation employed was as follows:

| | | |
|---|---|---|
| ZnS | grams | 9 |
| CuCl | do | 13 |
| Ag₂S | do | 1.2 |
| Ochre | do | 80 |
| Oil | cc | 50 |
| Alcohol | cc | 50 |

An excellent green stain was produced on the glass surface.

*Example 6.*—A series of stain compositions was produced, and each composition was used to stain glass further to illustrate the invention. The formulations of the stain compositions and the results are presented in Table III below:

TABLE III

| Comp. No. | | 22 | 23 | 24 | 25 |
|---|---|---|---|---|---|
| ZnCO₃ | grams | 12 | 12 | | |
| CuCl | do | 13 | 13 | | |
| AgNO₃ | do | 1.2 | | 1.2 | 1.2 |
| Ag₂S | do | | 1.2 | | |
| CuS | do | | | 13 | |
| KCl | do | | | 5 | 5 |
| ZnS | do | | | 9 | 9 |
| Cu(OH)₂ | do | | | | 13 |
| Ochre | do | 80 | 80 | 80 | 80 |
| Oil | cc | 50 | 50 | 50 | 50 |
| Alcohol | cc | 50 | 50 | 50 | 50 |
| Firing Temperature | °F | 1,020 | 1,020 | 1,020 | 1,020 |
| Stain Color | | (¹) | (¹) | (²) | (³) |

¹ Yellow.
² Green.
³ Reddish amber.

Although the salts of copper, silver and zinc are generally applicable, salts wherein the metal cation predominates, or approximates 50 per cent by weight of the salt, are much to be preferred over salts having extremely large anions. The reason for this is due to the dilution effect of the large anions upon the concentration of the metal component or ion which effects the staining of the glass. Thus, the cuprous compounds are preferred rather than the cupric because there is a higher percentage of copper in the former than in the latter. Salts of the oxygen-free strong mineral acids are particularly satisfactory, since the anion portion of the salt is never materially heavier than the metal portion, and the sulfides are especially advantageous. The use of chloride salts of copper, silver and zinc, or of one of them, is advantageous because, in such case, the copper, silver and zinc salts provide, also, the inorganic chloride compound.

The copper, silver and zinc in the salts of these metals constitute the active staining portions of their respective salts in staining according to the invention. Therefore, the relative amounts of the salts may best be defined by reference to the relative percentages by weight of copper, silver and zinc present, these percentages being based upon the total weight of the three metal ions, calculated as metals.

Staining compositions can be obtained by combining Cu, Ag and Zn salts in widely varying proportions. There are no sharp limits delineating compositions which will stain glass and compositions which will not. It is essential, however, that all three metal cations be present, since the absence of any one is fatal to the improved staining characteristics attained by the combination of the three. While the minimum amount, calculated as above described, of each of the three metal ions required for staining according to the method of the invention will vary slightly depending upon the other components of the staining composition, at least about 0.875 per cent of Ag, at least about 1.8 per cent of Zn, and at least about 15 per cent of Cu are required to produce an active staining material having the improved staining characteristics herein described. The terms "per cent" and "parts" are used herein and in the appended claims to refer to per cent and parts by weight, unless otherwise indicated. For preferred results, the lower limit of Ag should be at least about 2.5 per cent; the lower limit of Zn should be at least about 20 per cent; and the lower limit of Cu should be at least about 40 per cent. Best commercial stains are produced when the Ag content is from about 2.5 per cent to about 10 per cent. The particle size of these staining ingredients is important, since larger particles do not react as quickly or as thoroughly and uniformly as do the smaller particles. For most effective results it is usually preferred that the particle size of the active staining ingredients in the uniform oil dispersion is all minus 300 mesh, U. S. Sieve Series, although satisfactory results can be achieved when the particle size of the material is all minus 100 mesh, preferably minus 150 mesh.

The maximum amounts of each of these metal ions permissible in staining compositions is established, in part, by the minimals of the other two, but over 21 per cent of Ag has no apparent beneficial effect upon the staining properties of the composition. With the usual grade of zinc sals, such as ZnS, dependable stains are difficult to obtain when over 70 per cent of Zn is present, but the use of extremely finely divided ZnS, for example, permits as high as 85 per cent of Zn to be employed. Copper in amounts as high as about 90 per cent may be employed, but 85 per cent of Cu is preferred as an upper limit.

In addition to the copper, silver and zinc ions, it is necessary that at least a certain amount of an inorganic chloride compound be present. The presence of as little as 1.4 per cent of chlorine, derived from one or more of the salts of copper, silver and zinc, or derived from another inorganic chloride compound, and based upon the total amount of copper, silver and zinc, calculated as metals, is sufficient to cause the appearance of some green staining. When at least about 2.8 per cent of chlorine, calculated as indicated, is present, a good green stain can be obtained. Additional amounts of chlorine do not produce any material change in the staining properties of the composition other than a slight darkening, until the amount thereof exceeds about 115 per cent, calculated as indicated. Chlorine above this percentage may cause etching of the glass and deterioration of the staining color and is, therefore, undesirable. Accordingly, any amount of chlorine from about 1.4 per cent to about 115 per cent, calculated as indicated, is satisfactory. Ordinarily, for practical reasons, from about 2.8 per cent to about 20 per cent of chlorine is preferred.

ADDITIONAL INGREDIENTS FOR STAIN COMPOSITION

While the active staining ingredients may be used by themselves to produce a stain on glass, much more satisfactory results are obtained when other ingredients are added. Ochre is useful as such an additional ingredient, serving to disperse and to dilute the active staining ingredients, as well as to give body to the stain composition to assist in its application to the glass surface.

Ochre is a standard ingredient for most stain compositions and is both cheap and readily available. The composition of the ochre used in the examples hereinbefore set forth is as follows:

| | |
|---|---|
| Ferric oxide | 52.52 |
| Silica | 26.37 |
| Alumina | 11.05 |
| Moisture | 0.81 |
| Loss on ignition | 9.25 |

The exact composition of the ochre is a matter of choice, but a particular ochre should be selected and standardized if accurate reproduction of stain colors is to be achieved, since the ochre composition does affect the color of the stain to a certain extent. The amount of dispersing agent will vary with the composition of the active staining ingredients, but must be controlled within certain limits, since an extremely wide range may even vary the color of the stain, due to the dilution effect. Other dispersing agents may be used, but ochre is preferred because of its low cost and availability.

Oil is used in amounts sufficient to form the staining composition into a slip having the desired consistency. The consistency or viscosity desired of a staining slip will vary with the intended use. When a flat surface is to be stained, a relatively thin or low viscosity slip may be employed satisfactorily. When a curved surface, such as a lamp bulb, is to be stained, a more viscous slip must be provided in order to be retained in a uniform layer upon the surface. The amount of oil employed will also vary considerably with the particular ingredients of the stain. For example, much less oil is required to achieve a given viscosity for a stain in which the dispersing agent or ochre has been omitted than in one which contains a large amount of ochre. In addition, if the stain composition is to be used for decorating glassware, as by applying it in a desired pattern to a glass surface, for example, by a silk screening technique, the viscosity of the staining composition must be controlled within relatively narrow limits so that application by spraying is possible, but the stain slurry, after application, does not run or spread from the pattern in which it has been applied. Since the amount of oil required varies with both the end use and the stain composition, no practical limitations therefor can be set, but any one skilled in the art may readily determine by routine experiment that proportion of oil which is most desirable under any given circumstances. In general, the identity of the oil used for forming the uniform dispersion for staining ingredients is not material, since the oil is used only as a carrier for the staining ingredients and does not enter into the actual staining reaction. However, unless particular viscosity characteristics are desired of the staining composition it is preferred to use water as the carrier for the active staining ingredients as disclosed and claimed in my co-pending application Serial No. 321,275, now abandoned. Accordingly, when an oil dispersion is employed, this is usually in order to achieve a particular desired result with the staining composition, which result is frequently a decoration of a glass surface by staining techniques, as described above. Therefore, the use of conventional screening oils for forming dispersions for staining glass according to the invention is usually preferred, even though various other oils and even lower petroleum fractions such as gasoline, naphtha and kerosene alcohols and other volatile solvents can also be employed. In any event, the oil that is used should be one that is volatilized at a temperature below about 800° F., approximately the minimum temperature at which staining can be effected according to the invention, as hereinafter described.

METHOD OF MAKING AND APPLYING THE STAIN COMPOSITION

The various ingredients of the stain composition may be combined by a number of different procedures, none of which appears materially to affect the staining characteristics of the resulting composition. One procedure which has been found to be highly satisfactory for preparing the staining composition involves grinding the various components of the stain in a ball mill containing porcelain balls. The copper, silver and zinc salts may be added to the ball mill, followed by approximately half the total amount of oil to be added to the composition. The stain ingredients are then ground, preferably until they will pass through a 200 mesh screen, U. S. Sieve Series, at which time the remaining portion of the oil is added to make a slurry of the desired consistency. The particle size of the active staining ingredients affects the staining properties of the composition as above noted.

The staining composition is applied to the surface of the article to be stained by dipping, spraying, brushing, screening, or the like. The dipping procedure is fast and adaptable to automatic assembly line procedure, but, as above noted, oil dispersions are preferably used when their particular characteristics are desired, for example, because silk screening is to be employed. Control of the viscosity of the slurry, in any event, is required in order to obtain a coating of the stain composition of optimum thickness by the particular technique of application being employed. When the stain coating or "mud" is too thick, cracks form during the baking procedure which ultimately show up in the finished article as unstained lines. If the slurry is too thin, the stain may not be continuous or may be too light because of low concentration of the active staining ingredients. Routine experiment will establish the satisfactory viscosity that is best for any particular operation.

In the baking operation, fairly close control of the temperature of the blast must be maintained to obtain desired, predetermined color. The temperature employed will be determined in part by the melting or softening point of the glass being stained, but temperatures in excess of 1100° F. destroy the staining composition by metallizing the copper, silver and zinc salts. Since there is considerable lag in temperature rise between the air in an oven and the glass body, temperature should be taken directly from the glass surface that is being stained. Indirect heating or heating by conduction is preferred to direct heating by radiation, since more uniform heating of all sides of the article to be stained may be obtained. In baking the "mud" coated article, the article is placed in an oven and heated slowly to a predetermined temperature, such as about 900° F. If the glass article is relatively thin so that no strains will develop, it may then be immediately removed from the oven and allowed to cool in the air. For thicker articles, such as heavy bottles or flatware, cooling should be gradual. The "mud" is then removed by washing and brushing, and the finished stained article is obtained. Throughout this specification staining temperatures given are the temperatures to which the glass surface has been heated, and the above-described staining procedure is employed unless otherwise stated.

For best results in staining aged glass or glass which contains decolorants, such as selenium and antimony, a prebaking process is quite advantageous. The glass surface to be stained is heated to a temperature slightly in excess of that which is to be used in the staining operation and then allowed to cool. The heat treated surface may then be washed and subsequently stained as above described. Much deeper stains result when this prebaking step is employed on the aged glass or glass containing decolorants than when the glass is directly stained without this preliminary step.

COLOR OF STAINS

Stain compositions comprising the present invention have the remarkable property of producing a variety of stains upon many different types of glass surfaces. Also, these stain compositions produce colors never before obtained in glass stains. Numerous factors are interrelated in determining the color of the stain produced. The respective amounts of the four active staining ingredients present, and particularly the amount of silver, plays a major role in color determination. The baking is another factor which may be employed to control the color of the stain. As above indicated, the amount and type of ochre, the type of glass, the presence of sulfides, and the particle size of the active staining ingredients also affect the color of the stain to a lesser degree, and so must be standardized to obtain careful color control and to reproduce a given color.

An amber color stain is obtained when the baking temperature ranges from 800° F. to 925° F., regardless of the particular amounts of the active staining ingredients. When the Ag ion is present in amounts over 21% (of Cu, Zn, Ag total), an amber is obtained at any baking temperature between 800° F. and 1100° F., the upper limit established by the decomposition point of the staining ingredients. With staining compositions containing less than 21% Ag ion, a red or green stain is obtained at baking temperatures between 925° and 1100° F., depending upon the composition of the stain. Red stains may be obtained even with the lower amount of Ag ion, which usually produces a green stain, by carefully maintaining the baking temperature just below 1000° F., but such a procedure is difficult to follow and mixed colors frequently are obtained.

The predominant factor in controlling the color of the stain is the percentage of the three metal ions, Ag, Zn and Cu. Less than one percent of silver introduces a green color into the stain, while further additions up to about 8 per cent tend to darken the green color. The transition point from red to green is from about 8 per cent to about 10 per cent of silver, and above 10 per cent of silver but under 21 per cent of silver results in a red stain. Over 21 per cent of silver an amber stain is obtained, even at baking temperatures at 1000° F., and little change is obtained by increasing the silver above this percentage.

While this transition from green to red to amber is true generally of increased amounts of silver, the percentage of silver at which these changes occur will vary somewhat with the ratio of copper to zinc. For example, an increase in percentage of copper with a corresponding decrease in percentage of zinc tends to decrease the redness of a stain produced from a composition containing enough silver for a red stain.

The chemical mechanism which is responsible for staining of glass according to the method of the invention is not understood. It has definitely been established that each element of the combination of active staining ingredients is required, and that an inorganic chloride compound is also necessary.

STAINING DIFFERENT GLASSES

Stain compositions of the present invention are useful, not only in the staining of soda-lime glass, but other types as well, including lead glass, borosilicate glass, etc. Different colors may be obtained on different types of glasses with the same staining composition.

Having described the invention, I claim:

1. A method of staining glass surfaces which comprises forming a finely divided, uniform oil dispersion containing copper, silver and zinc salts and an inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

2. A method of staining glass surfaces which comprises forming a finely divided, uniform oil dispersion containing copper, silver and zinc salts and an alkali metal chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

3. A method of staining glass surfaces which comprises forming a finely divided, uniform oil dispersion containing copper, silver and zinc salts and an alkaline earth chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

4. A method of staining glass surfaces which comprises forming a finely divided, uniform oil dispersion containing copper, silver and zinc salts and aluminum chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

5. A method of staining glass surfaces which comprises forming a finely divided, uniform oil dispersion containing copper, silver and zinc salts and ammonium chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

6. A method of staining glass surfaces which comprises forming a finely divided, uniform oil dispersion containing copper, silver and zinc salts, at least two of which salts are sulfides, and an inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and in proportions such that the molecular ratio of sulphur to chlorine is from 1:0.5 to 1:25, coating a glass surface with said dispersion, and heating the coated glass surface to a temperature from about 800° F. to about 1100° F. to produce a stained glass surface.

7. A method of staining glass surfaces which comprises forming a finely divided, uniform oil dispersion containing copper, silver and zinc salts, at least two of which salts are sulfides, and an alkali-metal chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and in proportions such that the molecular ratio of sulphur to chlorine is from 1:0.5 to 1:25, coating a glass surface with said dispersion, and heating the coated glass surface to a temperature from about 800° F. to about 1100° F. to produce a stained glass surface.

8. A method of staining glass surfaces which comprises forming a finely divided, uniform oil dispersion containing copper, silver and zinc salts, at least two of which salts are sulfides, and an alkaline earth chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and in proportions such that the molecular ratio of sulphur to chlorine is from 1:0.5 to 1:25, coating a glass surface with said dispersion, and heating the coated glass surface to a temperature from about 800° F. to about 1100° F. to produce a stained glass surface.

9. A method of staining glass surfaces which comprises forming a finely divided, uniform oil dispersion containing copper, silver and zinc salts, at least two of which salts are sulfides, and aluminum chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and in proportions such that the molecular ratio of sulphur to chlorine is from 1:0.5 to 1:25, coating a glass surface with said dispersion, and heating the coated glass surface to a temperature from about 800° F. to about 1100° F. to produce a stained glass surface.

10. A method of staining glass surfaces which comprises forming a finely divided, uniform oil dispersion containing copper, silver and zinc salts, at least two of which salts are sulfides, and an ammonium chloride in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and in proportions such that the molecular ratio of sulphur to chlorine is from 1:0.5 to 1:25, coating a glass surface with said dispersion, and heating the coated glass surface to a temperature from about 800° F. to about 1100° F. to produce a stained glass surface.

11. A method of staining glass surfaces which comprises forming a finely divided, uniform oil dispersion containing copper, silver and zinc salts and calcium chloride in amounts sufficient to stain glass, and in proportions such that, based upon the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

12. A method of staining glass surfaces which comprises forming a finely divided, uniform oil dispersion containing copper, silver and zinc salts and potassium chloride in amounts sufficient to stain glass, and in proportions such that, based upon the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver, and zinc present, calculated as metals, constitutes at least 1.4 per cent but not more than about 115 per cent, coating a glass surface with said dispersion, and heating the coated glass surface to a temperature from about 800° F. to about 1100° F. to produce a stained glass surface.

13. A method of staining glass surfaces which comprises forming a finely divided, uniform oil dispersion containing copper, silver and zinc chlorides in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, coating a glass surface with said dispersion, and heating the coated glass surface to a temperature from about 800° F. to about 1100° F. to produce a stained glass surface.

14. A composition of matter for staining glass comprising a finely divided, uniform oil dispersion containing copper, silver and zinc salts and an inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and chlorine, based on the total amount of copper, silver and zinc present, calculated as metals, constitutes at least 1.4 per cent but not more than about 115 per cent.

15. A composition of matter for staining glass comprising a finely divided, unform oil dispersion containing copper, silver and zinc salts and an inorganic chloride compound in amounts sufficient to stain glass, and in proportions such that, based upon the total amount of copper, silver and zinc present, calculated as metals, copper constitutes from about 40 per cent to about 85 per cent, silver from about 0.875 per cent to about 21 per cent, and zinc at least about 1.7 per cent, and chlorine, based on the total amount of copper, silver and zinc present, calculated as metals, constitutes at least 2.8 per cent but not more than about 115 per cent.

ORMONDE S. LEVI.

No references cited.